UNITED STATES PATENT OFFICE.

JULIUS HERBABNY, OF OFFENBACH-ON-THE-MAIN, GERMANY, ASSIGNOR TO K. OEHLER, ANILIN AND ANILINFARBEN-FABRIK, OF SAME PLACE.

BLACK TRISAZO DYE.

SPECIFICATION forming part of Letters Patent No. 644,291, dated February 27, 1900.

Application filed December 21, 1899. Serial No. 741,075. (Specimens.)

*To all whom it may concern:*

Be it known that I, JULIUS HERBABNY, doctor of philosophy, residing at Biebererstrasse 32, Offenbach-on-the-Main, in the Grand Duchy of Hesse, Germany, have invented new and useful Improvements in Black Trisazo Dyestuffs, (for which application for patent, numbered O. 3,272, was filed in Germany on October 23, 1899, by the firm of K. Oehler, at Offenbach-on-the-Main,) of which the following is a specification.

By subjecting the monoazo dyes which result from diazotized amido-naphthol-sulfonic acids and toluylene diamin sulfonic acids ($CH_3 : NH_2 : NH_2 : SO_3H$-1:2:6:4 or 1:2:4:6) to the action of diazo compounds there are two places in the molecule where they could enter into reaction, either in the radical of the benzene or in that of the naphthalene. Now my investigations have led to the discovery that in the present case the reaction takes place in the naphthalene radical. Thus by employing tetrazo compounds intermediate products are first obtained, being coupled in the naphthalene radical, and which may be further combined either with one molecule of the same or of another monoazo dye, or with one molecule of an amin, phenol, amidophenol, or their sulfonic or carboxylic acids. Thus valuable coloring-matters result which dye cotton without mordants and possess a considerable coloring power. They go easily on the fiber, giving good even shades, resisting well soaping, though readily soluble. Most of them may be discharged by either bisulfite and zinc-dust or by stannous chlorid, so that pure white discharge effects can be obtained. They may also be diazotized and developed on the fiber and combined with diazo compounds, thus yielding heavy dark and very fast shades.

In the following I shall give an example in what manner the process is to be carried out for obtaining mixed substantive trisazo dyestuffs from one molecule of a paradiamin, one molecule of a monoazo coloring-matter, and one molecule of an amido-naphthol-sulfonic acid.

The monoazo coloring-matters are prepared in the known manner by combining in an acetic acid or alkaline solution the amidonaphthol-sulfonic acids, diazotized, as usual, with the sulfonic acids of the meta-diamins. Proceed as follows, parts being by weight: Prepare in the usual way from 18.4 parts of benzidin or from the equivalent quantity of tolidin or dianisidin a tetrazo compound and pour it into a strong soda alkaline solution of fifty parts of the sodium salt of the monoazo coloring-matter derived from amido-naphthol-mono-sulfonic acid G and toluylene-diamin-sulfonic acid. The intermediate product is formed at once and most of it separates as a black precipitate. On adding a solution of 26.5 parts of the sodium salt of the 2:8-amido-naphthol-sulfonic acid G, the formation of the dyestuff begins quickly and is completed after twelve hours. Then heat, precipitate with common salt, filter, press, and dry.

The coloring-matter thus obtained forms a brown-black powder easily soluble in water with a dark blue-black color and dyes unmordanted cotton black. With tolidin and dianisidin similar dyestuffs are obtained, but of a more greenish shade, and with 2:8-amido-naphthol-disulfonic acid products of greater solubility result.

Now what I claim, and desire to secure by Letters Patent, is the following:

As new articles of manufacture the polyazo coloring-matters, adapted to dye unmordanted cotton a full fast black; which result from the combination of one molecule of a paradiamin first with one molecule of a monoazo coloring-matter from 2:8-amido-naphthol-sulfonic acid and toluylene-diamin-sulfonic acid, then with one molecule of an amido-naphthol-sulfonic acid, according to the general formula $$\text{Para-diamin} \begin{cases} \text{Monoazo coloring-matter from diazotized 2:8-amido-naphthol-sulfonic acid + toluylene-diamin sulfonic acid} \\ \text{Amido-naphthol sulfonic acid,} \end{cases}$$

substantially as hereinbefore described; which are gray to brown-black powders with a metallic luster, easily dissolving in water to a bluish-black solution, from which on adding hydrochloric acid a dark-blue precipitate is separated; on addition of a little soda-lye the color does not change, but much soda-lye produces a reddish-violet precipitate; concentrated sulfuric acid yields a pure-blue solution, from which on addition of water a bluish-violet precipitate separates out.

In testimony whereof I have signed my name to this specification in the presence of two subscribing witnesses.

JULIUS HERBABNY.

Witnesses:
RICHARD GUENTHER,
CARL GRUND.